United States Patent

[11] 3,569,818

| [72] | Inventors | Rodney J. Dahlinger<br>Canoga Park;<br>Robert P. Farnsworth, Los Angeles, Calif. |
|---|---|---|
| [21] | Appl. No. | 843,351 |
| [22] | Filed | July 22, 1969 |
| [45] | Patented | Mar. 9, 1971 |
| [73] | Assignee | Hughes Aircraft Company<br>Culver City, Calif. |

[54] MULTIPLE OUTPUT DC VOLTAGE REGULATOR
18 Claims, 2 Drawing Figs.

[52] U.S. Cl.................................................. 321/2,
307/17, 307/33, 307/39, 323/18, 323/58
[51] Int. Cl.............................................H02m 3/28,
G05f 1/64
[50] Field of Search......................................... 321/2, 8,
27; 323/6, 18, 22, 38, 57—62; 307/17, 33, 35, 36,
39; 331/113.1

[56] References Cited
UNITED STATES PATENTS
| 3,305,756 | 2/1967 | Doss et al. .................... | 321/2 |
| 3,388,309 | 6/1968 | Banks et al. ................... | 321/2 |

FOREIGN PATENTS
| 1,297,898 | 0/1962 | France ........................ | 321/2 |

*Primary Examiner*—J. D. Miller
*Assistant Examiner*—Gerald Goldberg
*Attorneys*—James K. Haskell and Walter J. Adam ABSTRACT: A transformer having a multiplicity of secondary windings is employed to provide a multiplicity of different regulated output voltages by turning on a transistor switch in series with the primary winding, the unregulated voltage and a selected one of the regulated output voltages whenever the selected output voltage, so driven, falls below a reference voltage. When the selected output voltage is driven above reference voltage, the transistor switch is turned off. Diodes rectify the secondary winding currents that result when the switch turns off, to charge filter capacitors. The primary or one of the secondaries, whichever is employed to provide regulation of the selected output voltage, is clamped during the off period to the previously driven voltage. This clamping action produces on all output terminals regulated voltages related to the clamping voltage by a transformer turns ratio. A separate boost winding may be provided on the transformer to cause the transistor switch to be operated in saturation during the on cycle.

PATENTED MAR 9 1971 3,569,818

INVENTORS.
RODNEY J. DAHLINGER,
ROBERT P. FARNSWORTH,
BY
J K Haskell
ATTORNEY.

3,569,818

1

MULTIPLE OUTPUT DC VOLTAGE REGULATOR

BACKGROUND OF THE INVENTION

This invention relates to a voltage regulator, and particularly, to a DC voltage regulator which converts unregulated DC voltage to a multiplicity of output voltages which are stable over a wide range of variations of the unregulated voltage.

In the conventional DC voltage regulator, commonly referred to as pulse width modulated (PWM) regulator, a switch is operated in response to a comparison of filtered output voltage to a reference voltage. The pulse actuating the switch is periodic and is modulated as to its width or period of duration (duty factor) in proportion to the difference between the output and the reference voltages.

While such PWM regulators have been widely used for individual output voltages, until recently a single PWM regulator had not been used to convert the unregulated voltage to a multiplicity of output voltages of one or both polarities, each stable over a wide range of variations of the input voltage. Instead, switches having fixed duty cycles have been employed to convert the input voltage into a multiplicity of unregulated voltages using a transformer having a plurality of secondary windings, one for each output voltage with a suitable rectifier and filter.

The PWM technique has now been used for regulation of a multiplicity of output voltages using a magnetic amplifier to modulate the duty factor of a stable oscillator driving input switches to a transformer in response to comparison of one output voltage to a reference. However, the efficiency of such a regulator, both as to cost of production and operation, is low due to the need for a stable oscillator, and means for modulating the duty factor of each half cycle of the oscillator output.

SUMMARY OF THE INVENTION

An object of this invention is to provide efficient regulation of a multiplicity of output DC voltages for a wide range of DC input voltage variations.

This and other objects of the present invention are achieved by a transformer having a multiplicity of secondary windings for providing a multiplicity of different regulated output voltages. A switch in series with the primary winding, an unregulated voltage source and a selected one of the regulated output voltages is turned on by control means in response to comparing means to drive the selected output voltage whenever it falls below a reference voltage. Once the selected output voltage is driven above the reference voltage, the transistor switch is turned off by the control means in response to the comparing means. Diodes rectify the secondary winding currents that result when the switch is turned off, to charge filters. The primary winding, or one of the secondary windings, whichever is employed to provide regulation of the selected output voltage, is clamped during the off period to the previously driven voltage of the selected output voltage. This clamping produces across each filter connected to a secondary winding a regulated voltage related to the clamping voltage by a turns ratio, and helps maintain the selected output voltage during the off portion of the cycle.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
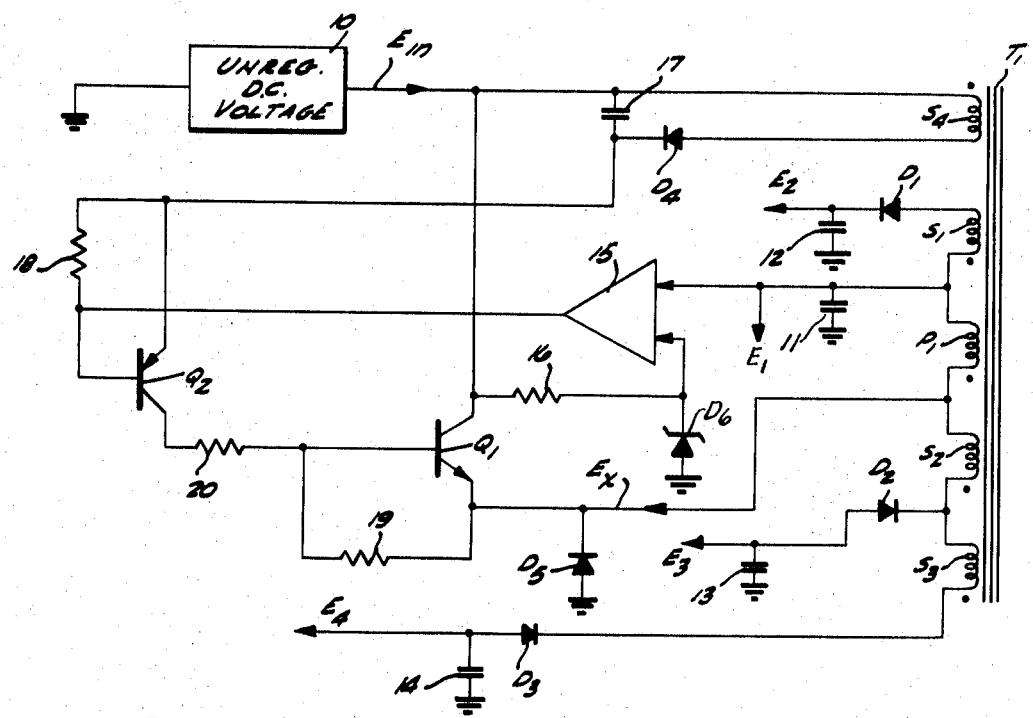
FIG. 1 is a schematic diagram illustrating a first embodiment of the present invention.

Referring to FIG. 1, an NPN transistor $Q_1$ is connected as a series switch between a source 10 of unregulated DC voltage ($E_{in}$ and a primary winding $P_1$ of a transformer $T_1$. While the transistor $Q_1$ is turned on, current flows through the primary winding to charge a capacitor 11 and supply current to loads connected to $E_1$. At the same time, the voltages induced across secondary windings $S_1$ to $S_4$ have polarities that back bias diodes $D_1$ to $D_4$. Since the secondary windings are not supplying current, the current in the primary is inductive, i.e., is forced through he primary self inductance, and capacitors 12, 13 and 14 deliver currents to loads connected to receive respective voltages $E_2$, $E_3$ and $E_4$.

When the inductive current in the primary winding has increased the voltage $E_1$ across the capacitor 11 sufficiently, a voltage comparator 15 turns off the transistor $Q_1$ via a PNP transistor $Q_2$. Reverse current induced in the primary winding due to the collapsing flux drives the voltage $E_x$ across a diode $D_5$ in a negative direction. As that voltage swings below the voltage $E_1$, the polarity of the voltages in the secondary winding are reversed. The reverse voltages continue to build up until one or more of the diodes $D_1$, $D_2$ and $D_3$ are forward biased to charge capacitors 12, 13 and 14. The diode $D_5$ is also forward biased to provide a current path for the inductive (generated) current in the primary winding.

At the instant the transistor $Q_1$ is turned off, the primary and secondary windings of transformer $T_1$ maintain the following current relationships:

$$N_p I_p = N_p I_p^1 + N_{s1} I_{s1}^1 + N_{s2} I_{s2}^1 + N_{s3} I_{s3}^1$$

where $I_p$ is the primary current the instant before the transistor $Q_1$ is turned off $I_p^1$ is the primary current at the instant after the transistor $Q_1$ is turned off; $I_{s1}^1$, $I_{s2}^1$ and $I_{s3}^1$ are the currents in secondaries $S_1$, $S_2$ and $S_3$ respectively at the instant after transistor $Q_1$ is turned off; $N_p$ is the number of turns in the primary $P_1$; and $N_{s1}$, $N_{s2}$ and $N_{s3}$ are the number of turns in secondaries $S_1$, $S_2$ and $S_3$ respectively. The output voltage which has decreased the largest percentage from its nominal regulated voltage will initially draw all of the current until it has increased sufficiently for one or more of the other diodes to be forward biased. When all diodes are forward biased, the following voltage relationship pertains:

$$E_p = E_1 - E_x$$

$$N_p/E_p = N_{s1} 1 E x\ N_{s2} 1 E x\ N_{s3} 1 E$$

From this voltage relationship, it can be seen that the voltages $E_2$, $E_3$ and $E_4$ are being indirectly regulated as the voltage $E_1$ is being directly regulated to their associated turn's ratio with respect to the primary minus their diode drops. When the inductive current in the primary winding P has decreased below the level where it will maintain the output voltage $E_1$ to the reference voltage, the transistor $Q_1$ is closed and the cycle repeated. The reference voltage may be, for example, +6 volts maintained by a Zener diode $D_6$ connected to unregulated voltage of +24V by a resistor 16.

The desired voltage regulation can be maintained when the following conditions are satisfied:

$$P_1 = E_1 I_1;\ P_2 = E_2 I_2;\ P_3 = E_3 I_3;\ P_4 = E_4 I_4$$

$$P_T = P_1 + P_2 + P_3 + P_4$$

$$P_0 = P_2 + P_3 + P_4$$

$$F_d = \frac{\tau_1}{\tau_1 + \tau_2} = \frac{E_1}{E_{in}}$$

$$I_{in}(E_1) > \frac{P_0}{1 - F_d}$$

$$1 - F_d > \frac{P_0}{I_{in}(E_1)}$$

$$1 = F_d > \frac{P_1}{F_d}$$

$$1 - F_d > \frac{F_d P_0}{P_1}$$

$$1 > F_d \left(\frac{P_0}{P_1} + 1\right)$$

$$E_{in} > E_1 \left(\frac{P_0}{P_1} + 1\right)$$

Where $P_T$ is the total power of loads connected to receive voltages $E_1$ to $E_4$; $P_0$ is the output power to loads which do not involve the comparator 15; $F_d$ is the duty factor of the switch expressed as the ration of the time $\tau_1$ the transistor $Q_1$ is on to the total time the transistor is on and off, $\tau_2$ being the time the transistor $Q_1$ is off; and $I_{in}$ is the current through the transistor $Q_1$ while it is on. The number of secondary windings and additional output voltages is limited only by the foregoing power relationships and the conventional restraints of of standard transformer design.

When the transistor $Q_1$ is on, it should be saturated for greatest efficiency, but the potential of the base is then above that of the collector. To facilitate driving the transistor $Q_1$ to saturation with the comparator 15, which may be a single-ended differential amplifier, the emitter of the complementary type transistor $Q_2$ is connected to a filter capacitor 17 connected across winding $S_4$ by diode $D_4$ to provide a boost voltage which, when added to the input voltage $E_{in}$ will provide a sufficiently high voltage at the base of the transistor $Q_1$ via the emitter and collector of the transistor $Q_2$. A resistor 18 is selected to have, for example, 1K ohms to facilitate turning the transistor $Q_2$ off and on. When it is turned on, resistors 19 and 20 form a dividing network to positively forward bias the base-emitter junction of the transistor $Q_1$. For efficiency, those resistors are selected to be relatively small, such as 10 and 20 ohms, respectively.

Figure 2:
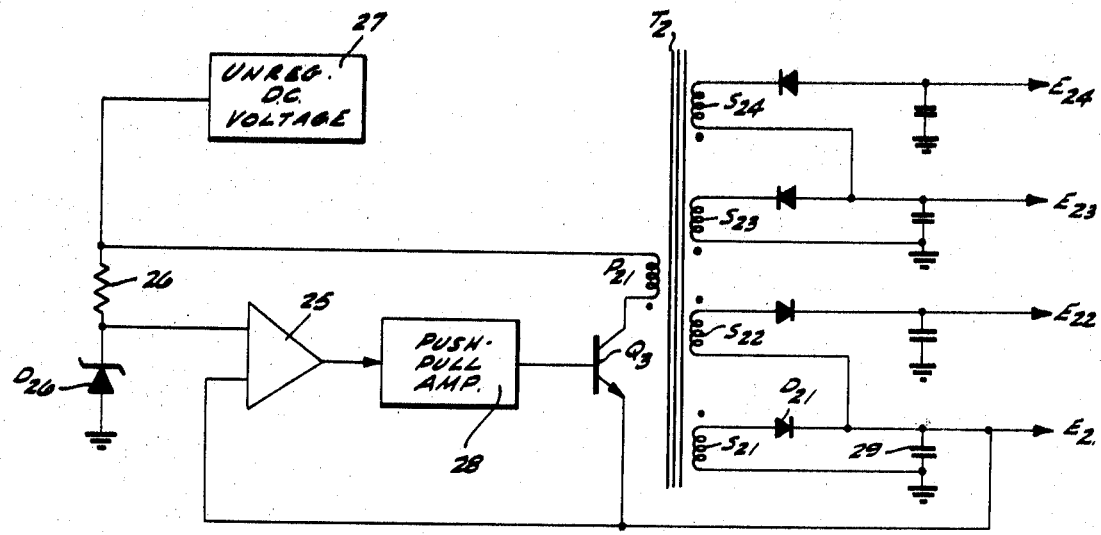
FIG. 2 is a schematic diagram illustrating a second embodiment of the present invention.

In the embodiment of fIG. 2, the transistor switch, comprising an NPN transistor $Q_3$ as in the embodiment of FIG. 1, is connected in series between primary winding $P_{21}$ and an output voltage $E_{21}$ regulated by the turn's ratio of a secondary winding $S_{21}$ to the primary winding $P_{21}$. A comparator 25 compares the regulated voltage $E_{21}$ with a reference voltage maintained by a Zener diode $D_{26}$ connected by a resistor 26 to a source of unregulated voltage 27. A push-pull amplifier 28 then drives the transistor $Q_3$ off and on. In that manner the secondary winding $S_{21}$ of transformer $T_2$ is clamped to the previously driven voltage $E_{21}$ without the need for a boost winding since the emitter of the transistor $Q_3$ will be tied to, for example, +6V stored by a filter capacitor 29.

A secondary winding $S_{22}$ may be provided with the same turn's ratio as the winding $S_{21}$ to provide +12 volts as the output voltage $E_{22}$ by connecting the secondary winding $S_{22}$ in series with a diode $D_{21}$, thereby effectively placing the voltage across the secondary winding $S_{22}$ in series with the regulated voltage $E_{21}$. Regulated voltages of −6 volts and −12 volts may be provided with secondary windings $S_{23}$ and $S_{24}$ in series in a similar manner.

From the foregoing preferred embodiments, it may be seen that the present invention provides an efficient regulator for a multiplicity of DC voltages by using one of the output voltages to bias the regulating switch on and off, and the regulating switch may be driven at higher frequencies without loss of efficiency. Each DC voltage provided is constant for a wide variation of the input voltage.

Although particular embodiments of the invention have been described and illustrated herein, it is recognized that modifications and variations may readily occur to those skilled in the art and, consequently, it is intended that the claims be interpreted to cover such modifications and equivalents.

We claim:

1. In a system for producing a multiplicity of regulated DC voltages from a source of unregulated DC voltage, the combination comprising:

first means for providing a DC reference voltage related to a given one of said regulated voltages;

a transformer having a primary winding and a multiplicity of secondary windings;

a switch connected in series with said source of unregulated DC voltage and said primary winding;

a multiplicity of rectifiers and filters selectively connected to said multiplicity of secondary windings and to said primary winding to produce said regulated DC voltages as said switch is turned on and off, and to clamp the winding connected to the filter producing said given one of said regulated voltages while said switch is off to a level of said regulated voltage produced while said switch was on;

means for comparing said given one of said regulated voltages with said DC reference voltage; and control means responsive to said comparing means to turn said switch on when said given one of said regulated voltages falls below said reference voltage, said given one of said regulated voltages being produced by charging current through said primary winding into a filter connected in series with said primary winding at an end opposite said switch, said charging current being furnished while said switch is on, and wherein other filters connected to secondary windings are furnished with inductive current through said secondary windings while said switch is turned off.

2. The combination of claim 1 wherein said secondary windings are connected in series with said primary winding, each secondary winding having a rectifier and filter at the end remote from said primary winding.

3. The combination of claim 2 wherein some secondary windings are connected in series with said primary winding at one end thereof for voltages of a given polarity, and some secondary windings are connected in series with said primary winding at the end thereof opposite said one end for voltages of a polarity opposite said given polarity.

4. The combination of claim 1 wherein said switch comprises a first transistor of a given conductivity type having its collector connected to said source of unregulated voltage, its emitter connected to said primary winding at the end remote from said filter receiving current to produce said given one of said reference voltage, and its base connected to said control means.

5. The combination of claim 4 wherein said control means comprises:

a boost secondary winding of said transformer having one end connected to said source of unregulated voltage;

a boost rectifier and filter connected between said one end of said boost secondary winding and the other end thereof to provide a boost voltage comprising a regulated DC voltage added to said unregulated voltage at the output of said boost rectifier and filter; and a second transistor of a conductivity type complementary to said given conductivity type having its collector connected to the base of said first transistor through a first resistor, its emitter connected to the output of said boost rectifier and filter, and its base connected directly to said comparing means, and a second resistor connecting the base of said second transistor to the output of said boost rectifier and filter, whereby sufficient voltage to saturate said first transistor is provided by said second transistor when said first transistor is turned on.

6. The combination of claim 5 including a third resistor connected between the base and emitter of said first transistor.

7. The combination of claim 6 wherein the rectifier connected to said primary winding to produce said given one of said regulated voltages is connected between the emitter of said first transistor and circuit ground to conduct inductive current from said primary winding when said first transistor is turned off.

8. The combination of claim 7 wherein said multiplicity of secondary windings are connected in series with said primary winding, said secondary windings having associated rectifiers and filters at the ends remote from said primary winding.

9. The combination of claim 8 wherein some secondary windings are connected in series with said primary winding at one end thereof for voltages of a given polarity, and some secondary windings are connected in series with said primary winding at the end thereof opposite said one end for voltages of a polarity opposite said given polarity.

10. The combination of claim 1 wherein said switch comprises a transistor having its collector connected to said source of unregulated voltage through said primary winding, its emitter connected to said given one of said regulated voltages, and its base connected to said control means.

11. The combination of claim 10 wherein said control means comprises a push-pull amplifier for driving the base of said transistor above said given one of said reference voltages sufficiently to drive said transistor into saturation when said given one of said regulated voltages falls below said reference voltage.

12. In a system for producing a multiplicity of regulated DC voltages from a source of unregulated DC voltage of a given polarity, the combination comprising:
   a DC reference voltage of said given polarity related to a given one of said regulated voltages;
   a transformer having a primary winding and a multiplicity of secondary windings, said primary and secondary windings being connected in series;
   a multiplicity of filters, one for each of said windings, each having a first terminal connected to circuit ground and a second terminal, and a particular filter having its second terminal connected to one end of said primary winding;
   a multiplicity of rectifiers, one rectifier for each of said secondary windings connected between one end thereof and a second terminal of a different one of said filters except said particular one, and a particular rectifier connected between circuit ground and an end of said primary winding opposite said one end to which said particular filter is connected, said particular diode being poled to be back biased by voltage of said given polarity;
   means for comparing said reference voltage with voltage across said particular filter to produce a drive signal when said voltage across said filter is less than said reference voltage; and
   a switch having input and output terminals connected in series between said source of unregulated DC voltage and said end of said primary winding opposite said one end to which said particular filter is connected, and having a control terminal adapted to receive said drive signal to turn said switch on in response thereto whereby driving current is provided to said particular filter when said switch is on, and said primary winding is clamped to voltage across said particular filter when said switch is turned off to produce all of said regulated voltages, each regulated voltage being related to said clamping voltage by a turn's ratio of one of said secondary windings associated therewith to said primary winding.

13. The combination of claim 12 wherein said switch comprises a first transistor of a given conductivity type having its collector connected to said source of unregulated voltage, its emitter connected to said primary winding at an end thereof remote from said particular filter, and its base adapted to receive said drive signal.

14. The combination of claim 13 wherein said base of said first transistor is adapted to receive said drive signal by a boost voltage system comprising:
   a boost secondary winding of said transformer having one end connected to said source of unregulated voltage;
   a boost rectifier and filter connected between said one end of said boost secondary winding and the other end thereof to provide a boost voltage comprising a regulated DC voltage added to said unregulated voltage at the output of said boost rectifier and filter; and
   a second transistor of a conductivity type complementary to said given conductivity type having its collector connected to the base of said first transistor through a first resistor, its emitter connected to the output of said boost rectifier and filter, and its base connected directly to said comparing means, and a second resistor connecting the base of said second transistor to the output of said boost rectifier and filter, whereby sufficient voltage to saturate said first transistor is provided by said second transistor when said first transistor is turned on by said drive signal from said comparing means.

15. The combination of claim 14 including a third resistor connected between the base and emitter of said first transistor.

16. The combination of claim 15 wherein some secondary windings are connected in series with said primary winding at one end thereof for voltages of a given polarity, and some secondary windings are connected in series with said primary winding at the end thereof opposite said one end for voltages of a polarity opposite said given polarity.

17. In a system for producing a multiplicity of regulated DC voltages from a source of unregulated DC voltage of a given polarity, the combination comprising:
   a DC reference voltage of said given polarity related to a given one of said regulated voltages;
   a transformer having a primary winding and a multiplicity of secondary windings;
   a multiplicity of rectifiers and filters selectively connected to said multiplicity of secondary windings and to said primary winding to produce said regulated DC voltages;
   a transistor having a collector in series with said source of unregulated voltage and said primary winding, and an emitter connected to one of said filters adapted to produce said given one of said regulated voltages, and a base adapted to receive a drive signal; and
   means for comparing said given one of said regulated voltages with said DC reference voltage and producing said drive signal to turn said transistor on while said given one of said regulated voltages is below said reference voltage, whereby the secondary winding connected to the rectifier and filter provided for producing said given one of said regulated voltages is clamped, while said transistor is turned off, to the voltage to which driven while said transistor was last turned on to produce all of said regulated voltages, each regulated voltage being related to said clamping voltage by a turn's ratio of one of said secondary windings associated therewith to said primary winding.

18. The combination of claim 17 wherein said means for comparing and producing said drive signal comprises a voltage comparator and a push-pull amplifier connected in cascade, with the push-pull output of said amplifier connected to the base of said transistor.